United States Patent
Tanaka et al.

(10) Patent No.: US 7,940,862 B2
(45) Date of Patent: May 10, 2011

(54) DATA DECODING METHOD AND DATA DECODING DEVICE EMPLOYING SAME

(75) Inventors: Yoshinori Tanaka, Kawasaki (JP); Hideo Miyazawa, Inagi (JP)

(73) Assignees: Fujitsu Limited, Kawasaki (JP); Fujitsu Frontech Limited, Inagi (JP)

( * ) Notice: Subject to any disclaimer, the term of this patent is extended or adjusted under 35 U.S.C. 154(b) by 676 days.

(21) Appl. No.: 12/003,940

(22) Filed: Jan. 3, 2008

(65) Prior Publication Data

US 2008/0137724 A1 Jun. 12, 2008

Related U.S. Application Data

(63) Continuation of application No. PCT/JP2005/012985, filed on Jul. 14, 2005.

(51) Int. Cl.
*H04L 27/00* (2006.01)
(52) U.S. Cl. .......................................................... 375/316
(58) Field of Classification Search .......... 375/237–242; 318/599; 370/212, 213; 332/109, 112
See application file for complete search history.

(56) References Cited

U.S. PATENT DOCUMENTS

| 5,640,160 | A | * | 6/1997 | Miwa | ............................... 341/53 |
| 6,064,697 | A | | 5/2000 | Yoshikawa | |
| 6,501,807 | B1 | | 12/2002 | Chieu et al. | |

FOREIGN PATENT DOCUMENTS

JP 9-130254 5/1997

* cited by examiner

*Primary Examiner* — Sam K Ahn
(74) *Attorney, Agent, or Firm* — Murphy & King, P.C.

(57) ABSTRACT

A data decoding method judges a signal state where there is a transition from a low level to a high level or from a high level to a low level at the center portion of a bit interval as logical "1" or "0", and a signal state where a low level continues or a high level continues over the entire bit interval as logical "0" or "1". The method has the steps of: measuring a first time duration in which the bit series signal transitions from a low level to the next low level, measuring a second time duration in which the bit series signal transitions from a high level to the next high level, and deciding a logical "0" or "1" value for the target bit to be decided based on the combination of the first time duration and the second time duration measured for the target bit.

9 Claims, 8 Drawing Sheets

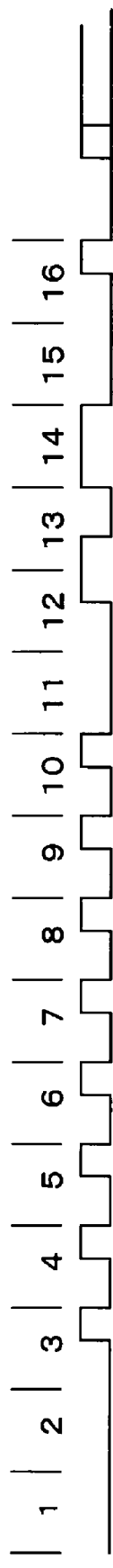

DATA DECODING METHOD AND DATA
DECODING DEVICE EMPLOYING SAME

CROSS REFERENCE TO RELATED
APPLICATIONS

This application is a continuation of International Application No. PCT/JP2005/12985, filed on Jul. 14, 2005, now pending, herein incorporated by reference.

TECHNICAL FIELD

This invention relates to a data decoding method, and to a data decoding device which employs this method. In particular, this invention relates to a data decoding method in a radio-frequency identification (RFID) reader/writer (interrogator) suitable for receiving signals from an RFID transponder.

BACKGROUND ART

In the engineering field in which data identification is performed automatically, there is currently a prominent trend toward adoption of RFID systems, in which an RFID transponder (also called an RFID tag) is attached to an object as a means of identifying data relating to the object, and response signals from the RFID transponder are received.

One example of such an RFID system is the invention disclosed in Patent Document 1. The invention disclosed in Patent Document 1 has the characteristic of oversampling data signals to increase data decoding probabilities.

Here, as the format of signals sent from an RFID transponder to an RFID interrogator, for example in ISO 18000-6, after the 16-bit preamble interval, data bits follow, as shown in FIG. 1.

Further, as the pattern representing data, in ISO 18000-6 the pattern shown in FIG. 2 is stipulated. As shown in FIG. 2A, as the pattern for FM0 encoding, taking as reference a clock signal with 50% duty, as the "1" and "0" logic, for data logical "0" the first half is High level and the second half is Low level, or, the first half is Low level and the second half is High level. For data "1", over 100% of the clock signal period the level is Low, or is at High level.

FIG. 2B is the case of an FM1 encoding pattern, in which the data logical "0" and "1" is the reverse of that for FM0 encoding.

As the method for decoding logical "0" or "1" from this FM0 (or FM1) encoding pattern, taking FM0 as an example, in a method of the prior art, after DC component for the FM0 is removed, and when the time duration from the rising edge to the falling edge or the time duration from the falling edge to the rising edge is longer than a reference time duration, then a data "1" is output, and if two continuous durations shorter than the reference time duration occur, then data is decoded as "0".

[Patent Document 1] U.S. Pat. No. 6,501,807

DISCLOSURE OF THE INVENTION

Here, shifts in the waveform duty may occur in the above FM0 data decoding, arising from characteristics specific to the RFID transponder, or from the ambient temperature or similar factors. When decoding received waveforms for which the-duty has shifted in this way, in the above methods of the prior art, the time duration from a rising edge to a falling edge or from a falling edge to a rising edge fluctuates, and comparison with the reference time duration is not possible. As a result, when decoding waveform signals with substantial distortion, there is the problem that normal data decoding is not possible.

Hence an object of this invention is to provide a data decoding method capable of decoding without being affected by duty shifts in received waveforms, and a data decoding device which employs such a method.

In order to attain the above object, a first aspect of the invention is a data decoding method for decoding data of a bit series in which a signal state where there is a transition from a low level to a high level or from a high level to a low level at the center portion of a bit interval is taken to be logical "1" or "0", and a signal state where a low level or a high level continues over the entire bit interval is taken to be logical "0" or "1" according to the above logical "1" or "0"; the data decoding method has a step of measuring an interval in which the bit series signal transitions from a low level to the next low level is measured as a first time duration; a step of measuring an interval in which the bit series signal transitions from a high level to the next high level is measured as a second time duration; and a step of deciding the target bit to be judged to be logical "0" or "1" based on the combination of the first time duration and the second time duration measured for a bit to be judged in the bit series.

In this invention, the logic of a target bit to be judged can be decided based on where, in a decision plane projected onto a two-dimensional plane, the combination of the first time duration and the second time duration exists for the bit to be decided.

Upon deciding the bit immediately preceding the target bit to be judged, when the immediately preceding bit is decided to be in a signal state where at the center portion of the bit interval the level makes a transition, taking a prescribed time duration as reference, when the measured first time duration and second time duration are the same, and moreover are twice the time duration taken as reference, the bit logic is decided to be the same as the immediately preceding bit logic; when each of the measured first time duration and second time duration are each equal to three or more times the time duration taken as reference, the bit logic is decided to be the opposite of the immediately preceding bit logic; further, upon deciding the bit immediately preceding the target bit to be decided, when the immediately preceding bit is decided to be in a signal state where the same level continues over the entire bit interval, taking a prescribed time duration as reference, when one among the measured first time duration and second time duration is twice the time duration taken as reference, the bit logic is decided to be the opposite of the immediately preceding bit logic, and when the measured first time duration and second time duration are each equal to three or more times the time duration taken as reference, the bit logic is decided to be the same as the immediately preceding bit logic.

Further, the prescribed time duration is obtained based on the pulse duration of a fixed data series inserted as a preamble preceding the bit series data signal.

Moreover, a configuration is possible in which, if the first time duration is X, the second time duration is Y, and the prescribed time duration is T, upon deciding the bit immediately preceding the target bit to be decided, when the bit immediately preceding the target bit to be decided is decided to be in a signal state where the level at the center portion of the bit interval continues to be the same level over the entire bit interval, a judgment is made as to whether the combination of the measured first time duration and second time duration exists in either of the two decision planes resulting from division of the two-dimensional plane by $Y=-X+5T$; and moreover, when it is decided that the immediately preceding bit is in a signal state where the same level continues over the entire bit interval, a judgment is made as to whether the combination of the measured first time duration and the second time duration exists in either of the two decision planes resulting from division of the two-dimensional plane by $Y=-X+6T$, and the logic of the bit to be decided is decided.

Moreover, in the above, a region may be set in which, for a relation between the first time duration X and second time duration Y, in the two decision planes divided by $Y=-X+5T$ and in the two decision planes divided by $Y=-X+6T$, code errors are decided according to the combination of X and Y.

Characteristics of this invention will be made clearer in preferred aspects of the invention which are explained below referring to the drawings.

In this invention, by performing decoding by combining two values which are the time duration from a rising edge to a rising edge and the time duration from a falling edge to a falling edge, decoding can be performed without being affected by shifts in the received waveform duty. Further, in a two-dimensional coordinate plane in which a first duration (the duration between rising edges, or the duration between falling edges) is X, and a second duration (the duration between falling edges, or the duration between rising edges) is Y, by forming decision planes, data decoding, and in particular FM0 (FM1) signal decoding, can be performed with high reliability, even when there is distortion in the received waveform.

BRIEF DESCRIPTION OF THE DRAWINGS

FIG. 1 is an example of a preamble pattern sent to an RFID interrogator from an RFID transponder;

FIGS. 2A and 2B show FM1 and FM0 code patterns representing data as stipulated in ISO18000-6;

PREFERRED EMBODIMENTS OF THE INVENTION

Figure 3:
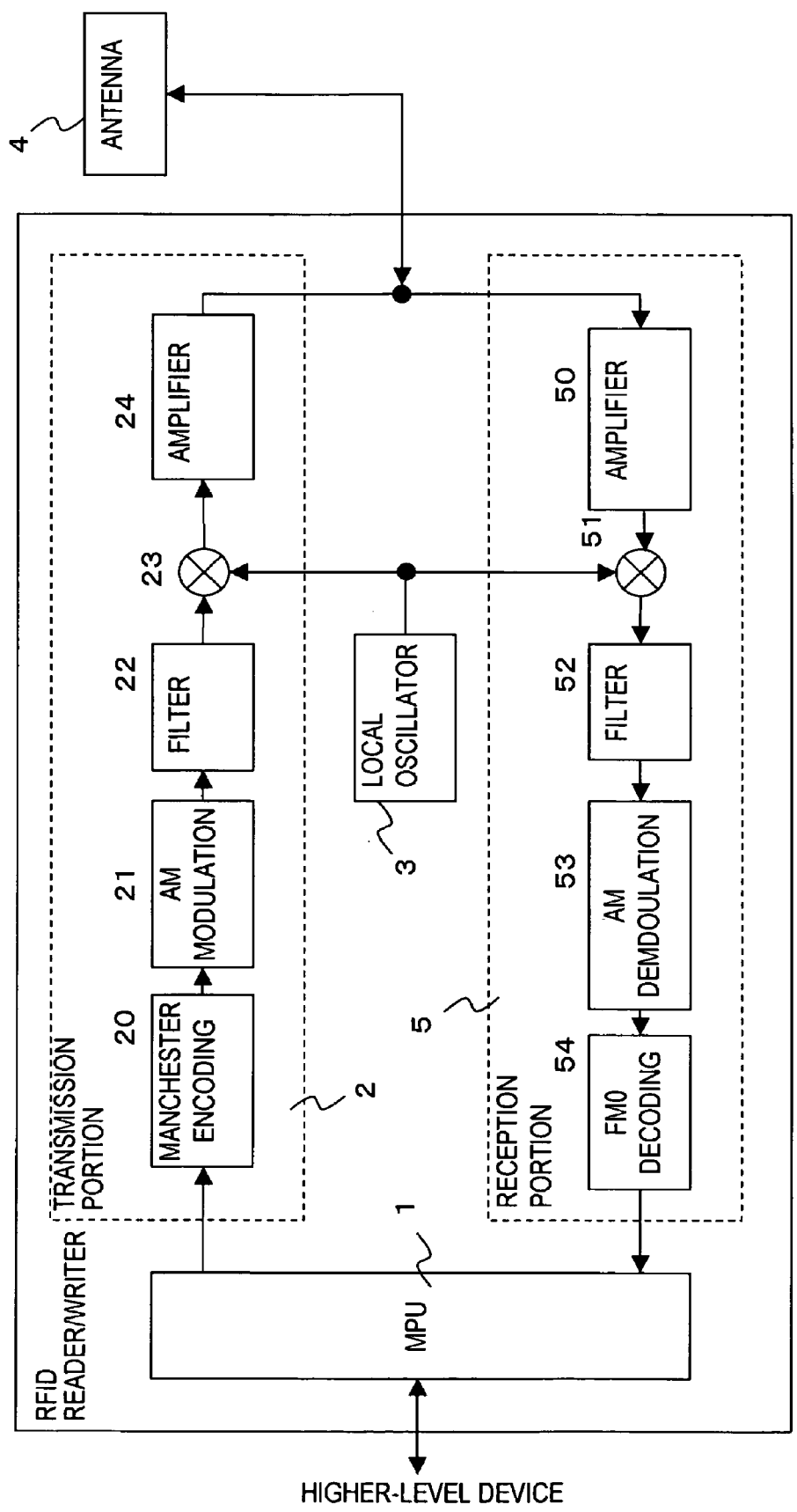
FIG. 3 shows an example of the basic configuration of an RFID transmission/reception device (RFID reader/writer) to which a data decoding method and data decoding device of this invention are applied.

Below, embodiments of the invention are explained referring to the drawings. The embodiments explained below are presented to aid understanding of the invention, and the technical scope of the invention is not limited to these embodiments.

FIG. 3 shows an example of the basic configuration of an RFID transmission/reception device (RFID reader/writer) to which a data decoding method and data decoding device of this invention are applied.

As a common control portion, a microprocessor (MPU) 1 is provided. When sending transmission signals to query an RFID transponder, the MPU 1 receives data from a higher-level device, not shown, and sends the data to the Manchester encoding portion 20 of the transmission portion 2.

In the Manchester encoding portion 20, encoding is performed to represent logical "0"s and "1"s by changing the level in the center of a bit interface from high level to low level, and conversely from low level to high level. Then, an AM modulation portion 21 adjusts the depths of the high level and low level of signals which have been Manchester-encoded. Further, the output of the AM modulation portion 21 is filtered by the filter 22 and sent to a modulator 23.

The modulator 23 modulates a carrier signal from a local oscillator 3 with the Manchester-encoded signal. The modulated carrier signal from the modulator 23 is power-amplified by a power amplifier 24, and radiated from a transmission/reception antenna 4.

The carrier signal radiated from the transmission/reception antenna 4 is received by a corresponding RFID transponder, not shown. The RFID transponder modulates the received signal with the FM0 code, and returns the result as a response signal to the RFID interrogator.

The transmission/reception antenna 4 receives this returned response signal, and inputs the signal to the amplifier 50 of the reception portion 5. The response signal, after amplification by the amplifier 50, is demodulated by the demodulator 51, and is converted to a baseband signal. Then, after passing through the filter 52, the signal is input to the AM demodulator 53. In the AM demodulator 53, the DC component is removed, and the output is input to the FM0 decoder 54.

Figure 4:
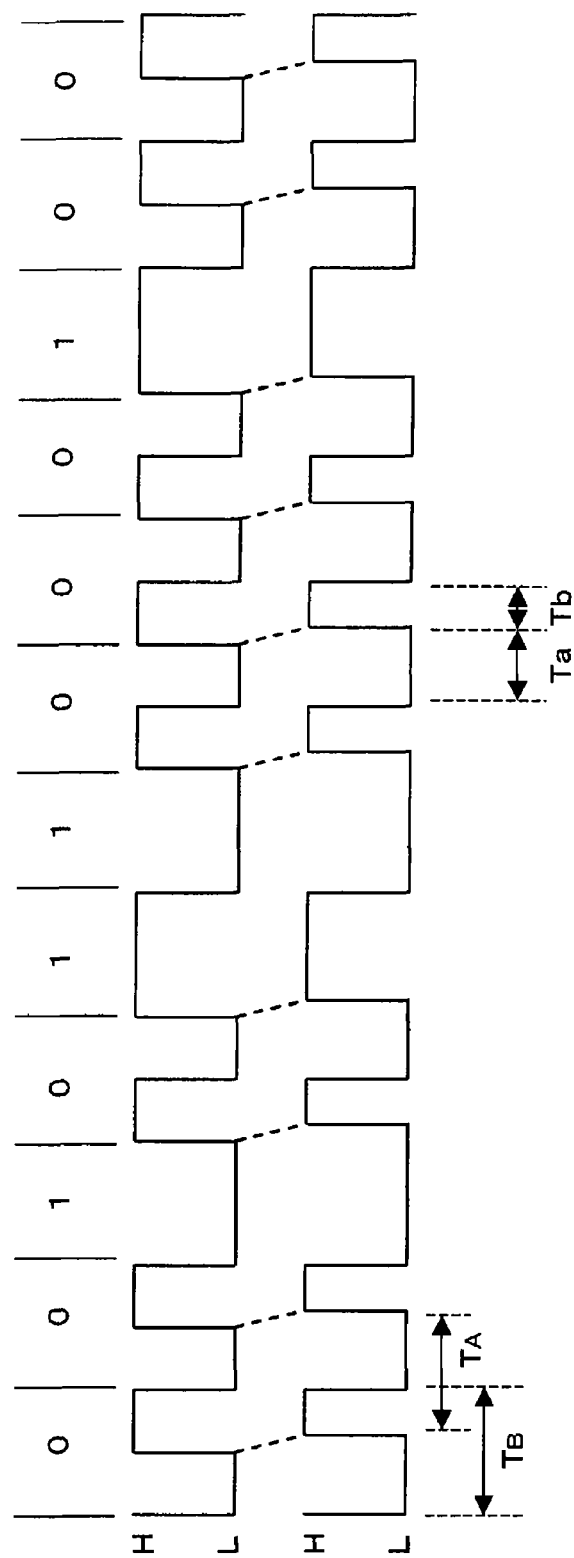
FIGS. 4A and 4B show an example of a signal input to a FM0 decoder 54.

Suppose that the signal input to the FM0 decoder 54 is as shown in FIGS. 4A and 4B.

FIG. 4A is an example of a normal FM0 signal series representing the code series "001011000100", when a change in the center of the bit interval from low (L) level to high (H) level, or a change in the center of the bit interval from H level to L level, represents logical "0", and a continuous H level or L level in the biter interval represents logical "1".

On the other hand, FIG. 4B shows a state where duty has shifted. This duty shift occurs due to characteristics intrinsic to the RFID transponder, or due to the ambient temperature or other factors, as explained above.

Here, in demodulation of this FM0 signal series, when using a method of the prior art only the time duration Ta from the falling edge to the rising edge, or only the time duration Tb from the rising edge to the falling edge, was used in comparison with a reference time duration.

At this time, when only the time duration Ta for example, from the falling edge to the rising edge, is used, it is impossible to judge whether the duty shift has caused the "1" duration to be reduced or the "0" duration to be broadened. As a result, when using such a method of the prior art, there is the problem that normal decoding is not possible when decoding waveforms with substantial deformation. Hence this invention resolves such problems.

Figure 5:
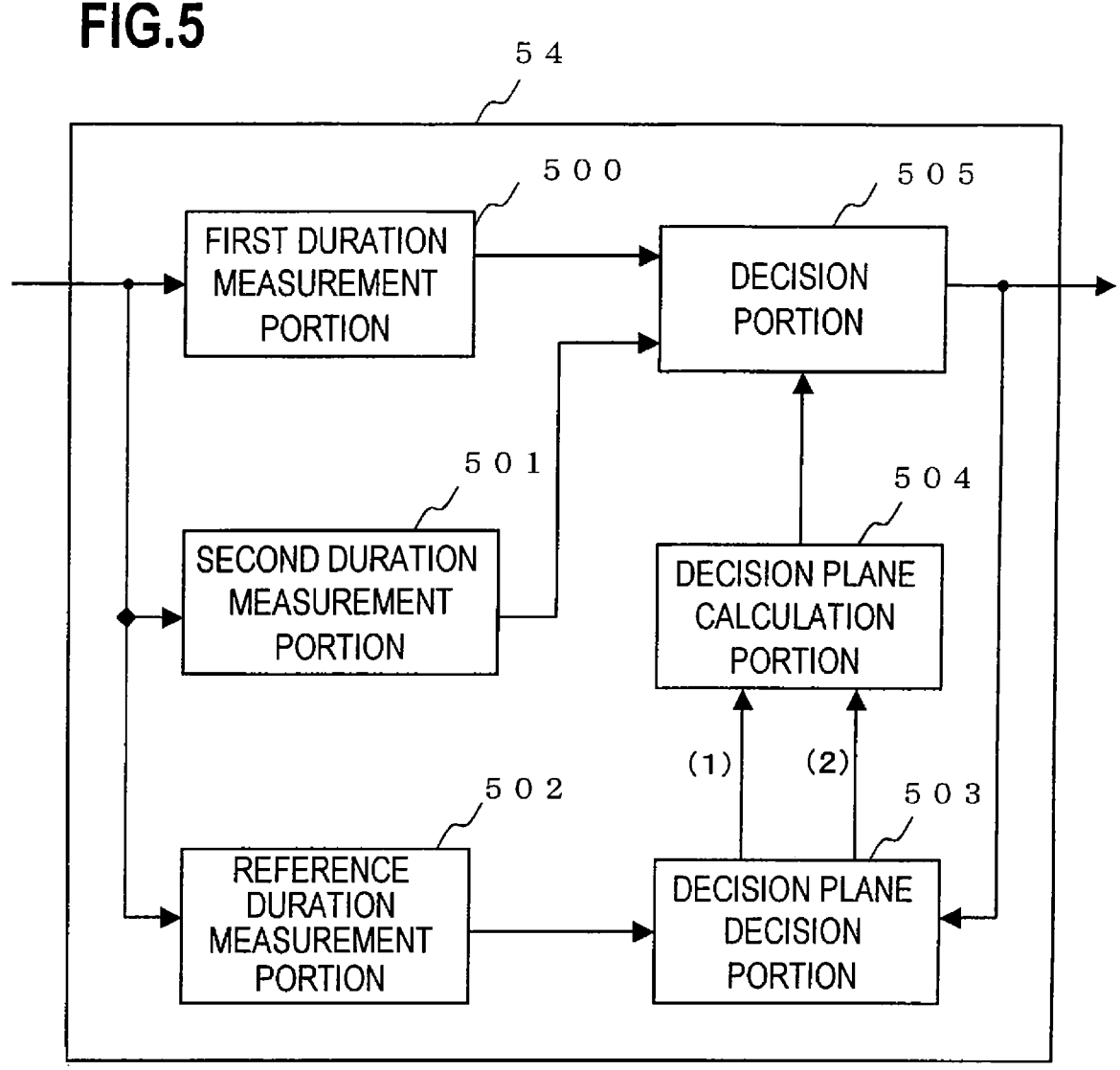
FIG. 5 is a block diagram of an example of the configuration of the FM0 decoder 54 in a reception portion 5 of this invention.
Figure 6:
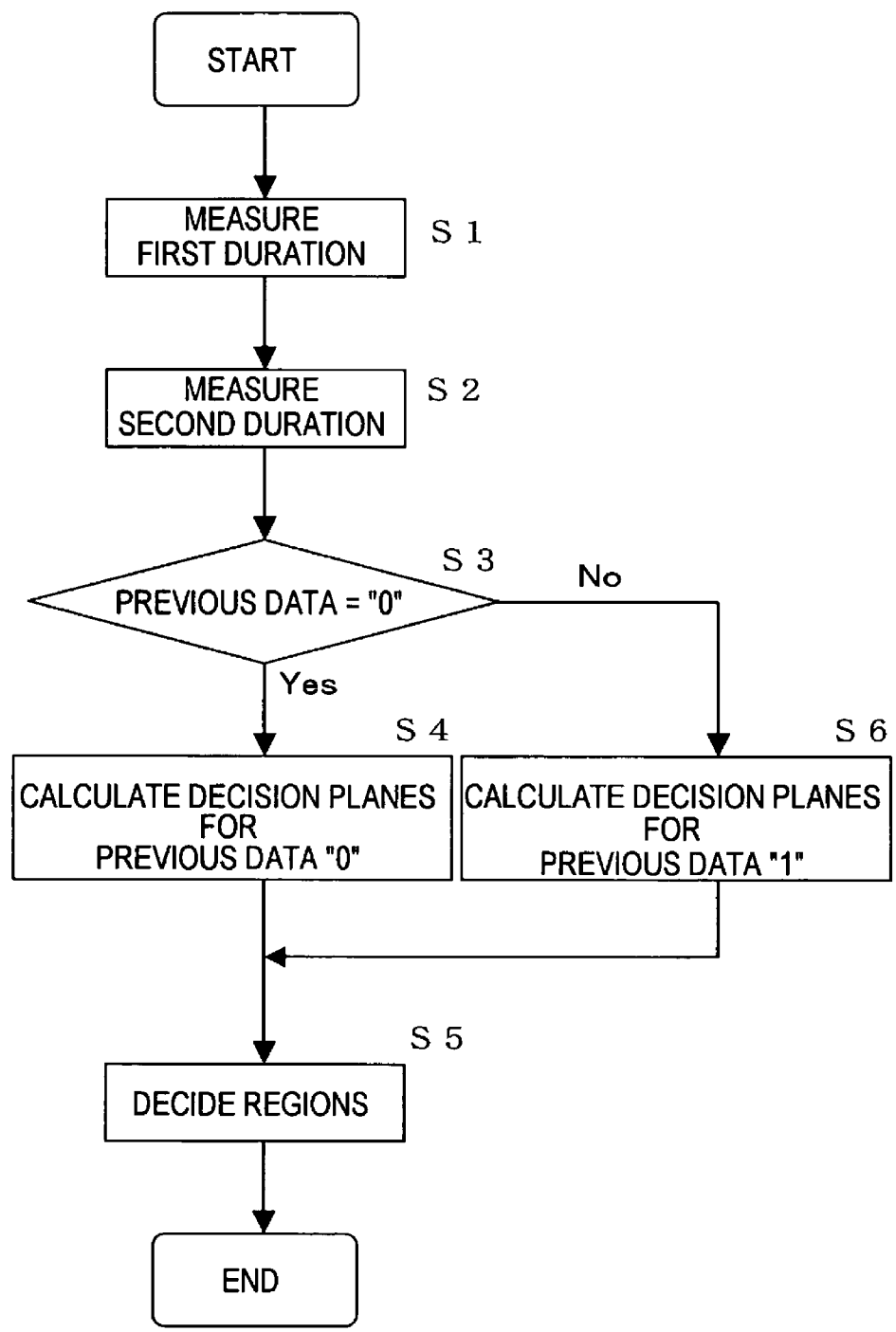
FIG. 6 shows the flow of processing of the FM0 decoder 54 shown in FIG. 5.

FIG. 5 is a block diagram showing an example of the configuration of the FM0 decoder 54 of a reception portion 5 of this invention. FIG. 6 shows the flow of processing of the FM0 decoder 54 shown in FIG. 5. Processing is similar for FM1 encoded signals as well.

In an FM0 decoder 54 of this invention, when an FM0 signal series is receive, the signals are input to the first duration measurement portion 500, second duration measurement portion 501, and to the reference duration measurement portion 502.

The first duration measurement portion 500 determines, as the first time duration TA, the time from the rising edge to the next rising edge in the signal series shown in FIGS. 4A and 4B (step S1: FIG. 6), the second duration measurement portion 501 determines, as the second time duration TB, the time from the falling edge to the next falling edge in the signal series of FIGS. 4A and 4B (step S2). And the first and second time durations TA and TB thus determined are sent to the decision portion 505.

The reference duration measurement portion 502 receives the signal format preamble returned from the RFID transponder shown in FIG. 1 to the RFID interrogator, determines ½ the time duration of a bit interval from repetitions of the same signal waveform, and inputs this to the decision plane decision portion 503 as the reference time duration T.

The decision plane decision portion 503 inputs the decision result for the bit immediately preceding the target bit to be decided from the decision portion 505.

The decision plane decision portion 503 sends to the decision plane calculation portion 504 an instruction to calculate one of the following equations (1) or (2), according to whether the decision result for the bit immediately preceding the target bit to be decided sent from the decision portion 505 is logical "0" or logical "1".

$$Y=-X+5T \quad (1)$$

$$Y=-X+6T \quad (2)$$

Here, the meanings of the above equations (1) and (2) are explained.

Figure 7A:
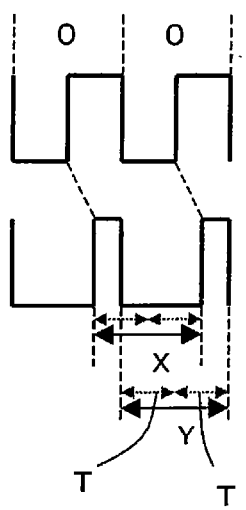
FIGS. 7A, 7B and 7C show an example of a duty shift when, in a bit series using FM0 code, the decision result for the bit immediately preceding the bit to be decided, sent from the decision portion 505 to the decision plane decision portion 503, is logical "0"
Figure 7B:
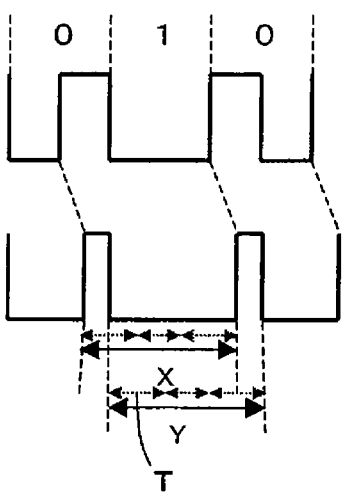
Figure 7C:
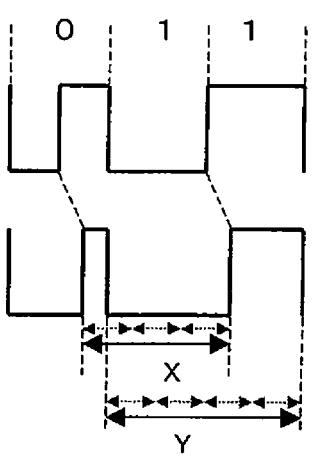

FIGS. 7A, 7B and 7C show an example of the duty shift when, in a bit series using FM0 encoding, the decision result for the bit immediately preceding the bit to be decided sent from the decision portion 505 to the decision plane decision portion 503 is logical "0".

Here, the interval in the bit series from low level to a transition to the next low level is defined as the first time duration X, and the interval from a high level to a transition to the next high level is defined as the second time duration Y.

At this time, for the duty shift state shown in FIG. 7A, the first time duration X and second time duration Y are substantially equal to twice the reference time duration T. Under these conditions, the decision result can be decided as the same logic as the logical "0" of the immediately preceding bit.

For the duty shift state shown in FIG. 7B, the first time duration and second time duration are the same, but the time duration is three times that of the reference time duration T. In this case, the target bit to be decided can be decided as a logical "1".

Further, FIG. 7C is a case in which the logic of the bit to be decided is the same "1" as in FIG. 7B, but the logic of the bit following the bit to be decided is "1". Hence the first time duration has a time duration three times the reference time duration, T, but the second time duration has a time duration four times the reference time duration T.

To summarize these relations, when the bit immediately preceding the target bit to be decided is decided to be in a signal state where the level has made a transition in the center of the bit interval (in the case of FM0 encoding, logical "0"), a prescribed time duration T is taken as reference, and when the first time duration and the second time duration are the same, and moreover, are twice the time duration T taken as reference (FIG. 7A), the bit is decided to be the same as the logic decision of the immediately preceding bit (for FM0 code, logical "0"). Further, when the first time duration and the second time duration are both three times the reference time duration T or longer, the bit logic is decided to be the opposite of the logic of the immediately preceding bit (FIG. 7B, FIG. 7C: for FM0 code, logical "1").

However, the first time duration X and second time duration Y may not take integral values, due to noise in the transmission path and similar, and so a decision based on regions is necessary.

Figure 8:
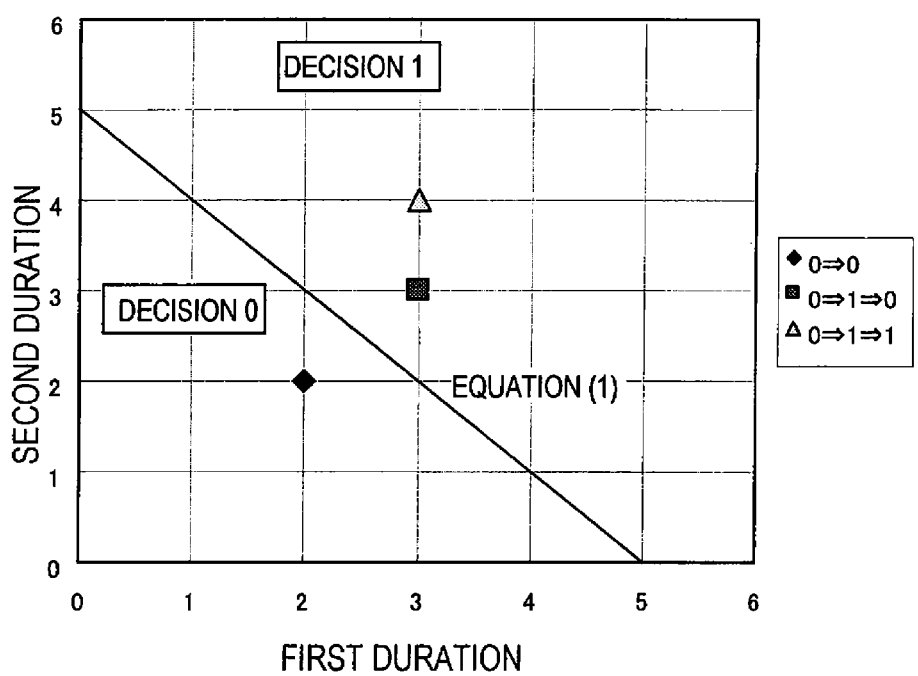
FIG. 8 shows two decision planes divided by the equation $Y=-X+5T$.

In the above relation, if the first time duration is X and the second time duration is Y, then representing the relation between X and Y in a two-dimensional plane, the logical values which can be taken by the bit to be decided are divided into two decision planes separated by the above equation (1), $Y=-X=5T$, as shown in FIG. 8.

That is, in the two-dimensional plane shown in FIG. 8, in the lower decision plane (logical "0") of the two decision planes divided by the equation $Y=-X+5T$ there exists the combination (2,2) of the first time duration and second time duration for the state of FIG. 7A, and in the upper decision plane (logical "1") there exist the combination (3,3) of the first time duration and second time duration for the state of FIG. 7B, and the combination (3,4) of the first time duration and second time duration for the state of FIG. 7C.

Figure 9A:
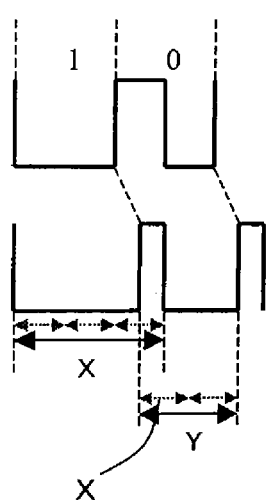
FIGS. 9A, 9B and 9C show an example of duty shift when, in a bit series using FM0 code, the decision result for the bit immediately preceding the bit to be decided, sent from the decision portion 505 to the decision plane decision portion 503, is logical "1"
Figure 9B:
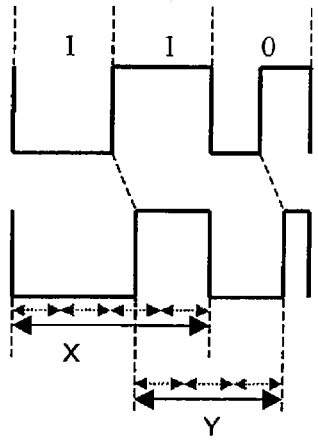
Figure 9C:
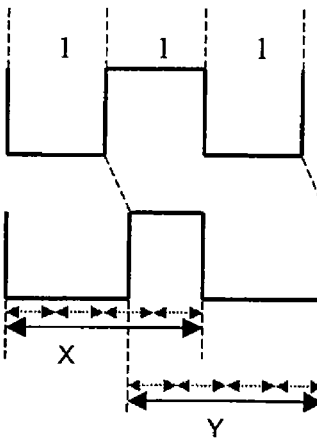

On the other hand, FIGS. 9A, 9B and 9C show an example of duty shift when, in a bit series using FM0 encoding, the decision result for the bit immediately preceding the bit to be decided sent from the decision portion 505 to the decision plane decision portion 503 is logical "1".

For the duty shift state shown in FIG. 9A, the first time duration is three times the reference time duration T, and the second time duration is twice the reference time duration T. Under these conditions, a decision can be made for a logical "1" opposite the logical "0" which was the decision result for the immediately preceding bit.

For the duty shift state shown in FIG. 9B, similarly to the state of FIG. 9A, the second time duration is three times the reference time duration T, and the first time duration is still longer. In this state, the bit to be decided can be decided to be the same logical "0" as the decision result for the immediately preceding bit.

Further, FIG. 9C is a case in which the bit logic for the bit to be decided is the same "1" as in FIG. 9B, but the bit following the bit to be decided is logical "1". Hence the first time duration is four times the reference time duration T, and the second time duration is also four times the reference time duration T.

To summarize these relations, when the bit immediately preceding the target bit to be decided is decided to be in a signal state where the same level continues for the entire interval of one bit (in FM0 encoding, logical "1"), when a prescribed time duration T is taken as reference, and the second time duration is shorter than the first time duration, and moreover the first time duration is three times the reference time duration T (FIG. 9A), the logical value is decided to be the opposite of the logical value decided for the immediately preceding bit (for FM0 encoding, logical "1").

Further, when the first time duration and the second time duration are both three times as long as the reference time duration T or longer, the value is decided to be the same logical value as the logical value of the immediately preceding bit (in FIG. 9B and FIG. 9C, for FM0 encoding, logical "1").

In FIGS. 9A, 9B and 9C, similarly to FIGS. 7A, 7B and 7C, the first time duration X and second time duration Y are not limited to integral values, due to noise in the transmission path and other factors, and so decision based on regions becomes necessary.

Figure 10:
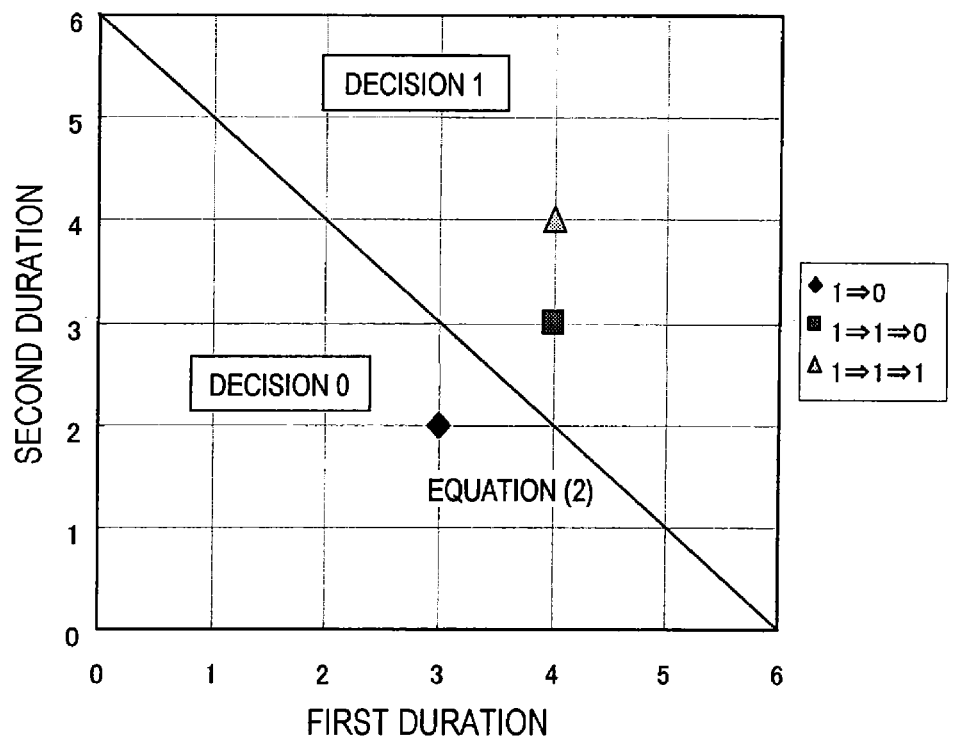
FIG. 10 shows two decision planes divided by the equation $Y=-X+6T$.

In the above relations, as shown in FIG. 8, when the first time duration is X and the second time duration is Y, and the relation between X and Y is represented on a two-dimensional plane, the logical values which can be taken by a bit to be decided are one of the two decision planes divided by the above equation (2), Y=−X+6T, as shown in FIG. 10.

That is, in the two-dimensional plane shown in FIG. 10, the combination (3,2) of the first time duration and second time duration of the state of FIG. 9A exists in the lower decision plane (logical "0") among the two decision planes divided by the equation Y=−X+6T; and in the upper decision plane (logical "1") there exist the combination (4,3) of the first time duration and second time duration for the state of FIG. 9B, as well as the combination (4,4) of the first time duration and second time duration for the state of FIG. 9C.

Returning to FIG. 5, the decision plane calculation portion 504 is instructed by the decision plane decision portion 503 to use the decision planes of either FIG. 8 or FIG. 10. That is, in the case of FM0 encoding, if the decision logic output for the immediately preceding bit from the decision portion 505 is logical "0", then the decision plane decision portion 503 sends notification to the decision plane calculation portion 504 indicating that equation (1) is to be used (step S3, Yes). On the other hand, if the decision logic output from the decision portion 505 for the immediately preceding bit is logical "1", then the decision plane decision portion 503 sends notification to the decision plane calculation portion 504 indicating that equation (2) is to be used (step S3, No).

Further, the decision plane calculation portion 504, upon receiving notification of either equation (1) or equation (2) as well as notification of the reference time duration T, calculates equation (1) or equation (2) (steps S4 and S5), generates combination data for the first time duration X and second time duration Y in the two decision planes divided by equation (1), Y=−X+5T, or by equation (2), Y=−X+6T, and sends the results to the decision portion 505.

Then, the decision portion 505 inputs from the first duration calculation portion 500 the first time duration X of the transition from the low level of the bit series signal to the next low level, and inputs from the second duration calculation portion 501 the second time duration Y from the high level of the bit series signal to the next high level.

Hence the decision portion 505 compares the combination of the input first time duration X and second time duration Y with the combination data of the first time duration X and second time duration Y in the two decision planes from the decision plane calculation portion 504, decides in which of the two decision planes divided by the equation Y=−X+5T in FIG. 8, or in which of the two decision planes divided by the equation Y=−X+6T in FIG. 10, the combination exists, and outputs the appropriate logical value "0" or "1" for the bit to be decided (step S5).

Here, in FIG. 8 and FIG. 10, a plurality of combinations of first time durations X and second time durations Y exist in the two decision planes divided by the equation Y=−X+5T and the two decision planes divided by the equation Y=−X+6T; of these, when the duty is shifted by a prescribed amount or more relative to the actual normal signal, it is appropriate that a code error be decided.

Figure 11:
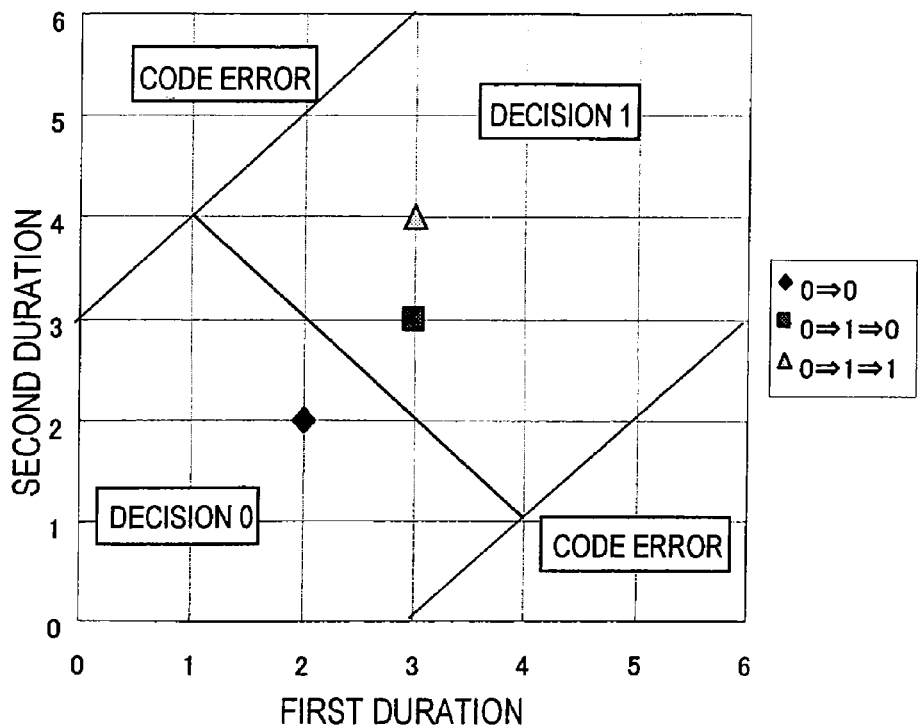
FIG. 11 shows an example of setting of a code error region for FIG. 8.
Figure 12:
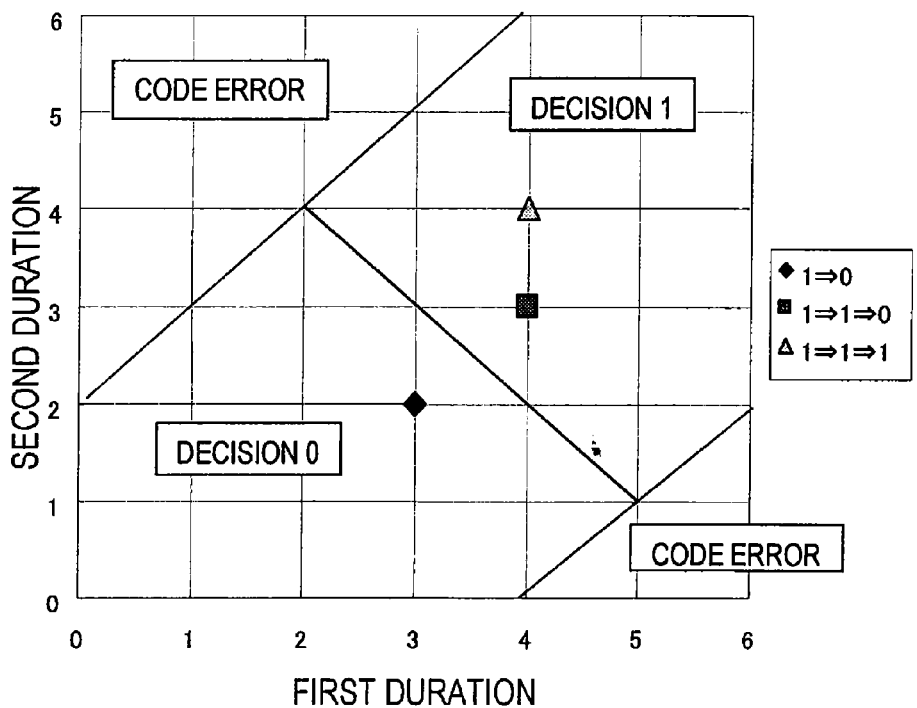
FIG. 12 shows an example of setting a code error region for FIG. 10.

FIG. 11 and FIG. 12 are examples of code error region settings for FIG. 8 and FIG. 10 respectively. That is, in FIG. 11, when the combination of the first time duration X and second time duration Y is in the region represented by the equation Y<X−3T and the equation Y>X+3T, the decision portion 505 decides that a code error has occurred.

Similarly in FIG. 12, when the combination of the first time duration X and the second time duration Y is in the region represented by the equation Y<X−4T and the equation Y>X+2T, the decision portion 505 decides that a code error has occurred.

In FIG. 8, FIG. 10, FIG. 11, and FIG. 12, the first and second durations are shown as normalized integers; but in actuality the first and second durations are not normalized, and are computed as real numbers containing the decimal point. Hence in the above explanation the durations X and Y were explains as combinations of integers, but an infinite number of combinations of X and Y are possible.

Further, as the essence of this invention, as shown above in FIG. 8 and FIG. 10, there is no need to divide the decision plane according to whether the bit preceding the target bit to be decided is logical "0" or "1", and region decisions can be made in arbitrary planes in the two-dimensional plane of the first duration and second duration, that is, if logical "0" and "1" can be partitioned, either method is possible. Bit logic can be decided by performing region decisions in decision planes in which the first and second durations are projected onto the two-dimensional plane and logical "0" and "1" are partitioned.

INDUSTRIAL APPLICABILITY

As explained above referring to the drawings, in this invention decoding is performed by combining two values, which are the time duration from a rising edge to a rising edge and the time duration from a falling edge to a falling edge, so that correct decoding can be performed even of received signals with large duty shifts, contributing to the reliability of RFID systems.

The invention claimed is:

1. A data decoding method in a data decoding device for decoding data of a bit series which judges a signal state where there is a transition from a low level to a high level or from a high level to a low level at the center portion of a bit interval as logical "1" or "0", and a signal state where a low level continues or a high level continues over the entire bit interval as logical "0" or "1" according to the above logical "1" or "0", comprising the steps of:

measuring an interval in which said bit series signal transitions from a low level to the next low level as a first time duration by a first duration measurement portion of the data decoding device;

measuring an interval in which said bit series signal transitions from a high level to the next high level as a second time duration by a second duration measurement portion of the data decoding device; and deciding a logical "0" or "1" value for a single bit to be decided in said bit series, based on the combination of said first time duration and said second time duration measured for said bit to be decided, according to a decision result of an immediately preceding said bit, by a decision portion of the data decoding device.

2. The data decoding method according to claim 1, said decision step comprises a step of deciding the logical value of said bit to be decided based on where, in a decision plane in a two-dimensional plane, the combination of said first time duration and said second time duration in said bit to be decided exists.

3. The data decoding method according to claim 1, said decision step comprises the steps of:
  deciding the logical value of said bit to be decided by judging that the combination of said measured first time duration and second time duration exists in which of two decision planes, resulting from partitioning the two-dimensional plane by Y=−X+5T, when taking said first time duration to be X, said second time duration to be Y, and a prescribed time duration to be T, if it is decided that a bit immediately preceding said target bit to be decided is in a signal state where a level transition occurs at the center portion of the bit interval; and
  deciding the logical value of said bit to be decided by judging that the combination of said measured first time duration and second time duration exists in which of two decision planes, resulting from partitioning the two-dimensional plane by Y=−X+6T, when said immediately preceding bit is decided to be in a signal state where the same level continues over the entire bit interval.

4. The data decoding method according to claim 3, wherein said prescribed time duration is obtained based on a pulse duration of a fixed data series inserted as a preamble preceding said bit series signal.

5. The data decoding method according to claim 3, further comprises a step of setting regions for code error decision based on the combination of X and Y in said two decision planes resulting from partitioning by Y=−X+5T, and in said two decision planes resulting from partitioning by Y=−X+6T for the relation between said first time duration X and said second time duration Y.

6. A data decoding device for decoding data of a bit series which judges a signal state where there is a transition from a low level to a high level or from a high level to a low level at the center portion of a bit interval as logical "1" or "0", and a signal state where a low level continues or a high level continues over the entire bit interval as logical "0" or "1" according to the above logical "1" or "0", comprising:
  a first duration measurement portion which measures an interval in which said bit series signal transitions from a low level to the next low level as a first time duration;
  a second duration measurement portion which measures an interval in which said bit series signal transitions from a high level to the next high level as a second time duration; and
  a decision portion which, based on the combination of said first time duration and said second time duration measured for a single bit to be decided in said bit series, decides a logical "0" or "1" value for said bit to be decided, according to a decision result of an immediately preceding said bit.

7. The data decoding device according to claim 6, wherein said decision portion decides the logical value of said bit to be decided based on where, in a decision plane in a two-dimensional plane, the combination of said first time duration and said second time duration in said bit to be decided exists.

8. The data decoding device according to claim 6, further comprising:
  a reference duration measurement portion which measures a pulse duration of a fixed data series inserted as a preamble preceding said bit series signal, and generates a reference time duration; and
  a decision plane calculation portion which, according to whether the decision result by said decision portion for a bit immediately preceding said bit to be decided is a logical "0" or "1", and taking said first time duration to be X, said second time duration to be Y and said reference time duration to be T, calculates equation (1) Y=−X+5T or equation (2) Y=−X+6T,
  wherein said decision portion decides a logical "0" or "1" value for said bit to be decided based on in which of the two decision planes, resulting from partitioning by equation (1) or equation (2) calculated by said decision plane calculation portion, the combination of said first time duration and said second time duration exists.

9. The data decoding device according to claim 8, wherein, for the relation between said first time duration X and said second time duration Y, in said two decision planes resulting from partitioning by Y=−X+5T, and in said two decision planes resulting from partitioning by Y=−X+6T, said decision portion further has regions for code error decision based on the combination of X and Y.

* * * * *